(12) United States Patent
Maercovich et al.

(10) Patent No.: US 8,087,636 B2
(45) Date of Patent: *Jan. 3, 2012

(54) AUTOMATE FLUID FLOW CONTROL SYSTEM

(76) Inventors: Jorge Maercovich, Woodland Hills, CA (US); Leo Maercovich, Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/460,371

(22) Filed: Jul. 16, 2009

(65) Prior Publication Data

US 2009/0283150 A1    Nov. 19, 2009

Related U.S. Application Data

(63) Continuation of application No. 11/525,769, filed on Sep. 22, 2006.

(51) Int. Cl.
*F16K 31/12* (2006.01)
(52) U.S. Cl. .................. 251/30.04; 251/40; 251/129.11
(58) Field of Classification Search .... 251/30.01–30.05, 251/40, 331, 129.11
See application file for complete search history.

(56) References Cited

U.S. PATENT DOCUMENTS 6,845,961 B2 * 1/2005 Maercovich et al. .... 251/129.03

* cited by examiner

*Primary Examiner* — John Fristoe, Jr.
*Assistant Examiner* — Marina Tietjen
(74) *Attorney, Agent, or Firm* — Raymond Y. Chan; David and Raymond Patent Firm (57) ABSTRACT

An automate fluid flow control system includes a valve member for being sealedly disposed within a fluid chamber to seal a flow of fluid flowing from a fluid inlet to a fluid outlet, a relief valve having a fluid passage extended along the valve member for communicating the fluid chamber with the fluid outlet and including a valve stopper sitting on a top opening of the fluid passage to sealedly close the fluid passage, and a powering assembly including an actuator to move the relief valve between a closed position that the valve stopper is sealedly retained to close the fluid passage and an opened position that the actuator drives the valve stopper to unseal the fluid passage for releasing a pressure within the water chamber to allow the fluid passing to the fluid outlet.

2 Claims, 12 Drawing Sheets

AUTOMATE FLUID FLOW CONTROL SYSTEM

CROSS REFERENCE OF RELATED APPLICATION

This is a Continuation application that claims the benefit of priority under 35 U.S.C. §119 to a non-provisional application, application Ser. No. 11/525,769, filed Sep. 22, 2006.

BACKGROUND OF THE PRESENT INVENTION

1. Field of Invention

The present invention relates to a fluid system, and more particularly to an automate fluid flow control system, which allows to automatically control a flow of fluid through a fluid system, such as a faucet system, a toilet system, a showering system, or even a water piping system.

2. Description of Related Arts

A fluid system, such as a toilet system, a faucet system, or a water piping system, generally comprises a fluid inlet, a fluid outlet, and a fluid valve device operatively communicating between the fluid inlet and the fluid outlet to control the fluid flowing from the fluid inlet to the fluid outlet.

For example, a manual operated valve device, using for in the faucet system or the toilet system, comprises a valve body communicating the water inlet with the water outlet, a relief valve disposed in the valve body for blocking the water flowing from the water inlet to the water outlet, and an actuation lever arranged to move the relief valve at a position that the water is allowed to flow to the water outlet for completing the water flowing operation.

For hygiene purposes, an improved valve device provides an automatic operation for the faucet system or the toilet system. Such valve device is a solenoid operated valve for utilizing a latching solenoid to limit power drain on the battery. Accordingly, when the infrared sensor detects the presence of a user of a faucet or toilet, the solenoid operated valve is automatically driven to open to complete the water flowing operation. However, the solenoid valve has several common drawbacks.

The presence of the user sensed by the infrared sensor will cause the solenoid to move the diaphragm to a valve open position. It is known that the solenoid is made of a number of circular wire loops to generate a magnetic force when an electric current is passed through the wire loops. The solenoid may come in contact with water such that the solenoid may accumulate rusting particles from the water, which may remain on the solenoid. It is one of the common problems to cause a failure of operation of the solenoid operated valve. In other words, the conventional manual operated valve is more reliable than the solenoid operated valve. Thus, the maintenance cost of the solenoid operated valve is higher than that of the conventional manual operated valve.

In addition, the structural design of the solenoid operated valve is different from that of the manual operated valve. In other words, when the fluid system is incorporated with the solenoid operated valve, the fluid system will lose the mechanical-manual operated feature. Therefore, there is no alternative to operate the water flowing cycle when the solenoid operated valve has failed to operate.

In order to install the solenoid operated valve into the conventional fluid system, the mechanical-manual operating mechanism of the valve must be totally removed, which is a waste of resources in order to incorporate with the solenoid operated valve.

The configuration of the solenoid operated valve is complicated, wherein once the solenoid is broken or the battery is dead, the facility should call a technician to open an outer cover and disassemble an inner cover for the replacement of the solenoid or the battery. Due to the complicated structure of the solenoid operated valve, the solenoid operated valve requires a skilled technician to replace the broken solenoid and/or even replace the battery, which may further increase the maintenance cost of the solenoid operated valve.

Especially when the solenoid operated valve is incorporated with the faucet system, the water temperature of the water at the water outlet is preset that cannot be selectively adjusted by the user. It is worth to mention that the user is able to selectively adjust the water temperature at the water outlet via the actuation lever. However, once, the solenoid operated valve is installed into the faucet system, the actuation lever must be removed from the original faucet which cannot be operated manually any more. Therefore, the technician must preset the water temperature for the faucet with the solenoid operated valve.

SUMMARY OF THE PRESENT INVENTION

A main object of the present invention is to provide an automate fluid flow control system, which allows to automatically control a flow of fluid through a fluid system, such as a faucet system, a toilet system, a showering system, or even a fluid piping system.

Another object of the present invention is to provide an automate fluid flow control system, which comprises an electric motor as a replacement of the solenoid to control a flow of fluid, so as to enhance the reliable of the operation of the automatic flush flow control system.

Another object of the present invention is to provide an automate fluid flow control system, which is powered by the electric motor so as to avoid water damage and to enhance performance and reliability.

Another object of the present invention is to provide an automate fluid flow control system, which provides an economic and efficient solution for incorporating with the conventional manual operated fluid flowing system in a simple and economical way.

Another object of the present invention is to provide an automate fluid flow control system, which is capable of incorporating with a conventional manual restroom water system, such as urinal or faucet, so as to automatically operate the automate fluid flow control system through the use of a sensor. Alternatively, the automate fluid flow control system can be automatically operated by a remote control instead of the sensor.

Another object of the present invention is to provide an automate fluid flow control system, wherein the conventional fluid system does not require to alter its original structural configuration in order to incorporate with the present invention. Therefore, the user is able to mechanically-manually operate the fluid system if the automatic operation system is not functioning properly.

Another object of the present invention is to provide an automate fluid flow control system, which is reliable and is easily installed and maintained in compassion with the convention solenoid operated valve.

Accordingly, in order to accomplish the above objects, the present invention provides an automate fluid flow control system for a fluid system having a fluid inlet, a fluid outlet, and a fluid chamber communicating between the fluid inlet and the fluid outlet, wherein the automate fluid flow control system comprises:

a valve member adapted for being sealedly disposed within the fluid chamber to seal a flow of fluid flowing from the fluid inlet to the fluid outlet;

a relief valve provided at the valve member for controlling the fluid flowing from the fluid chamber to the fluid outlet, wherein the relief valve has a fluid passage extended along the valve member for communicating the fluid chamber with the fluid outlet and comprises a valve stopper sitting on a top opening of the fluid passage to sealedly close the fluid passage for controlling the fluid flowing to the fluid outlet; and a powering assembly, comprising:

a power generator; and an actuator driven by the power generator to move the relief valve between a closed position and an opened position, wherein at the closed position, the valve stopper is sealedly retained to close the fluid passage for blocking the fluid passing to the fluid outlet, and at the opened position, the actuator drives the valve stopper to unseal the fluid passage for releasing a pressure within the water chamber to allow the fluid passing to the fluid outlet.

These and other objectives, features, and advantages of the present invention will become apparent from the following detailed description, the accompanying drawings, and the appended claims.

DETAILED DESCRIPTION OF THE PREFERRED EMBODIMENT

Figure 1:
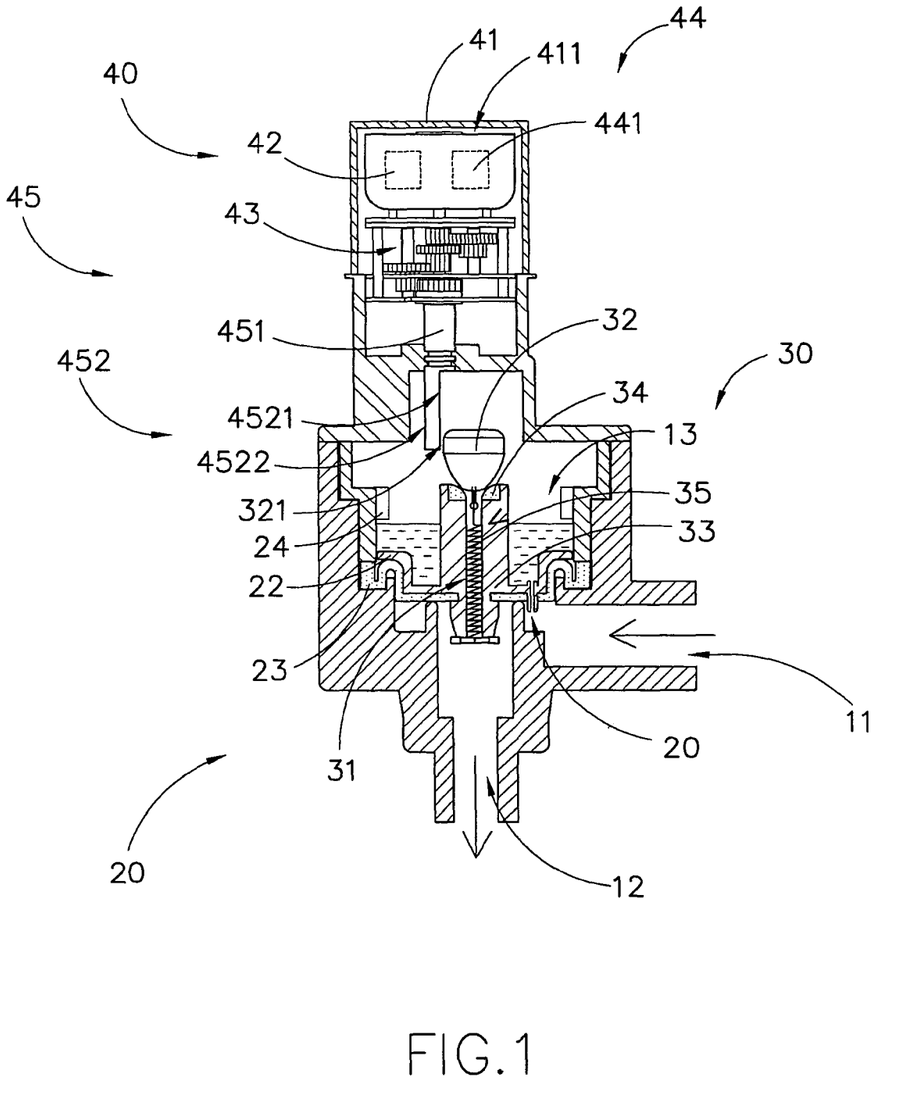
FIG. 1 is a sectional view of an automate fluid flow control system according to a preferred embodiment of the present invention.

Referring to FIG. 1 of the drawings, an automate fluid flow control system according to a preferred embodiment of the present invention is illustrated, wherein the automate fluid flow control system is adapted for incorporating with a conventional fluid system, such as a faucet system, a toilet system, a showering system, or even a fluid piping system.

The fluid system generally has a fluid inlet 11, a fluid outlet 12, and a fluid chamber 13 communicating between the fluid inlet 11 and the fluid outlet 12, wherein a flow of fluid passes from the fluid inlet 11 to the fluid outlet 12 through the fluid chamber 13.

According to the preferred embodiment, the automate fluid flow control system comprises a valve member 20, a relief valve 30, and a powering assembly 40.

The valve member 20 is adapted for being sealedly disposed within the fluid chamber 13 to seal a flow of fluid flowing from the fluid inlet 11 to the fluid outlet 12, wherein the valve member 20 is adapted for retaining a predetermined pressure within the fluid chamber 13 when the valve member 20 is sealed at the fluid chamber 13.

The relief valve 30 is provided at the valve member 20 for controlling the fluid flowing from the fluid chamber 13 to the fluid outlet 12, wherein the relief valve 30 has a fluid passage 31 extended along the valve member 20 for communicating the fluid chamber 13 with the fluid outlet 12 and comprises a valve stopper 32 sitting on a top opening of the fluid passage 31 to sealedly close the fluid passage 31 for controlling the fluid flowing to the fluid outlet 13.

The powering assembly 40 comprises a power generator 43 and an actuator 42 driven by the power generator 41 to move the relief valve 30 between a closed position and an opened position. In which, at the closed position, the valve stopper 32 is sealedly retained to close the fluid passage 31 for blocking the fluid passing to the fluid outlet 13, and at the opened position, the actuator 42 drives the valve stopper 32 to unseal the fluid passage 31 for releasing the pressure within the fluid chamber 13 to allow the fluid passing to the fluid outlet 12.

Accordingly, the valve member 20 comprises a sealing platform 22, having a bleed hole 220, arranged for sitting within the fluid chamber 13 and a sealing diaphragm 23 supported on the sealing platform 22 for movably sealing at the fluid chamber 13 to retain the pressure therewithin so as to normally close the fluid outlet 12.

Figure 2:
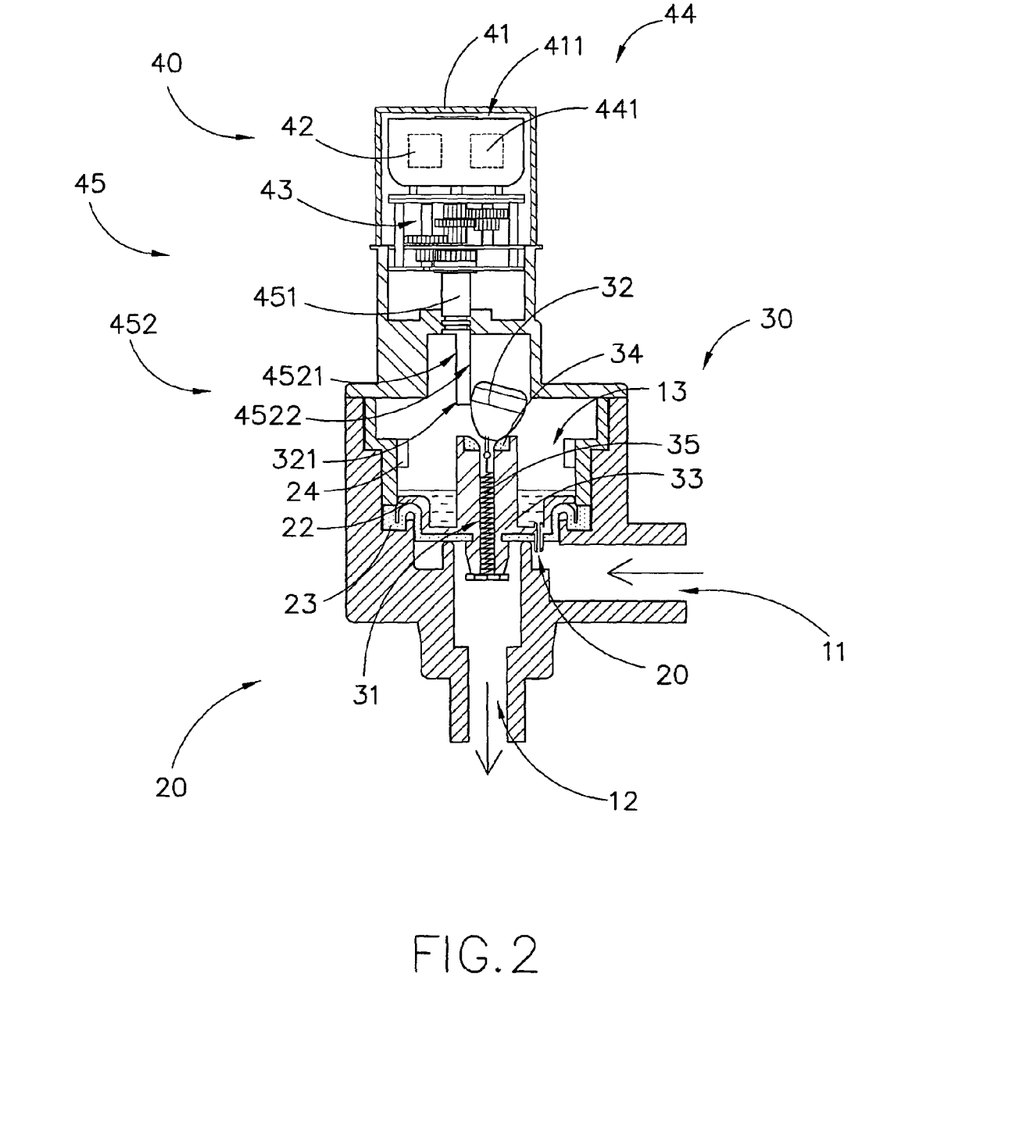
FIG. 2 is a sectional view of the automate fluid flow control system according to the above preferred embodiment of the present invention, illustrating the automatic operation of the automate fluid flow control system when releasing pressure within the fluid chamber.
Figure 3:
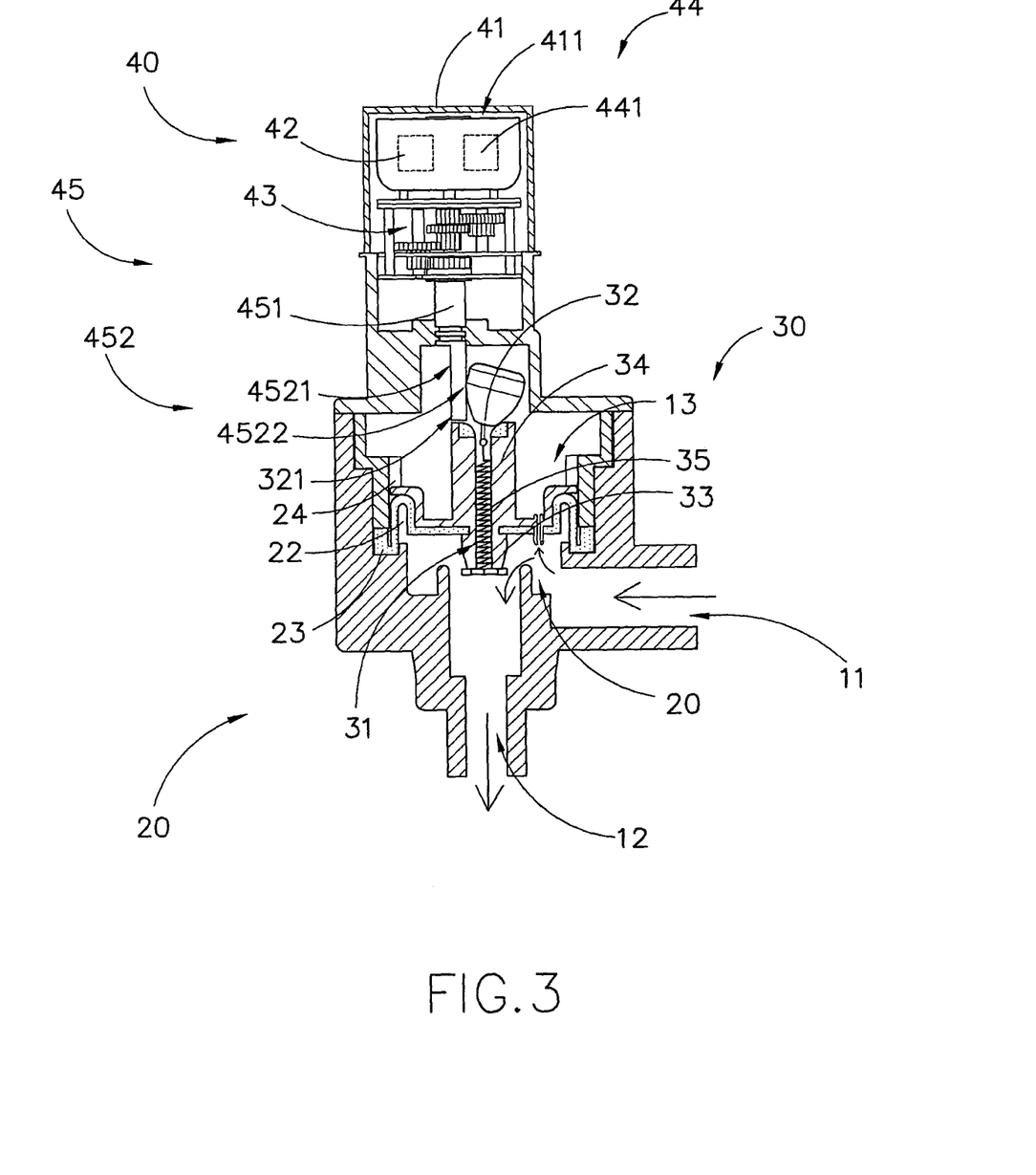
FIG. 3 is a sectional view of the automate fluid flow control system according to the above preferred embodiment of the present invention, illustrating the automatic operation of the automate fluid flow control system when lifting up the valve member.

As shown in FIGS. 1 to 3, when the pressure within the fluid chamber 13 is higher than a pressure at the fluid outlet 12, the sealing platform 22 is pressed to seal the sealing diaphragm 23 at the fluid outlet 12 so as to block the fluid passing from the fluid inlet 11 to the fluid outlet 12. Once the pressure within the fluid chamber 13 is reduced, the sealing platform 22 is automatically lifted that the sealing diaphragm 23 is popped up for unsealing the fluid outlet 12 so as to allow the fluid passing from the fluid inlet 11 to the fluid outlet 12. Accordingly, the bleed hole 220 is arranged for communicating the fluid chamber 13 with the fluid inlet 11.

The valve member 20 further comprises a retention member 24 supported within the fluid chamber 13 at a position above the sealing platform 22 to block the sealing platform 22 to be further lifted up when the pressure within the fluid chamber 13 is reduced.

The relief valve 30 further comprises a valve controlling shaft 33 coaxially extended from the sealing platform 22 of the valve member 20 wherein the fluid passage 31 is extended along the valve controlling shaft 33 for communicating the fluid chamber 13 with the fluid outlet 12. As shown in FIG. 1, the valve controlling shaft 33 has a top end extended within the fluid chamber 13 and a bottom end extended to said water outlet 12. In other words, the top opening of the fluid passage 31, i.e. the top end of the valve controlling shaft 33, is positioned within the fluid chamber 13 while a bottom opening of the fluid passage, i.e. the bottom end of the valve controlling shaft 33, is positioned at the fluid outlet 12 such that the fluid chamber 13 is communicating with the fluid outlet 12 through the fluid passage 31.

The valve stopper 32 is sat on the top end of the controlling shaft 33 at the top opening of the fluid passage 31 to sealedly close the fluid passage 31 for controlling the fluid flowing to the fluid outlet 13. It is worth to mention that when the valve stopper 32 seals the fluid passage 31, the pressure within the fluid chamber is retained to press the valve member 20 to seal at the fluid outlet 12.

According to the preferred embodiment, the relief valve 30 further comprises a sealing ring 34 mounted at the top end of the valve controlling shaft 33 around the top opening of the fluid passage 31 such that the valve stopper 32 is sat on the sealing ring 34 to seal the fluid passage 31 so as to block the fluid passing into the fluid passage 31 from the fluid chamber 13.

In order to retain the valve stopper 32 in position, the relief valve 30 further comprises a resilient element 35 coupling with the valve stopper 32 for applying an urging force against the valve stopper 32 so as to retain the valve stopper 32 at the closed position. According to the preferred embodiment, the resilient element 35 is a compression spring disposed within the fluid passage 31 for applying the urging force against the valve stopper 32 so as to normally pull the valve stopper 32 at the top opening of the fluid passage 31. As shown in FIG. 1, the resilient element 35 has a biasing end coupling with the valve stopper 32 and an opposed affixing end coupled with the bottom opening end of the fluid passage 31 to pull the valve stopper 32 at the top opening of the fluid passage 31 so as to block the fluid passing therethrough. It is worth to mention that a length of the resilient element 35 is shorter than a length of the fluid passage 31 such that when the biasing end and the affixing end of the resilient element 35 are coupled with the valve stopper 32 and the bottom opening end of the fluid passage 31 respectively, the resilient element 35 are stretched to pull the valve stopper 32 at the top opening of the fluid passage 31.

The powering assembly 40 comprises a housing 41, which is mounted on the valve member 20, having a power source compartment 411 and a power source 42 which is replaceably received in the power source compartment 411 and is electrically connected to the power generator 43. It is worth to mention that the power generator 43 is received in the housing 41 as shown in FIG. 1.

The powering assembly 40 further comprises a control processor 44 electrically connected to the power source 42 and the power generator 43 for sensing a presence of a user, so as to activate the power generator 43 to drive the actuator 45 to rotate. Accordingly, the control processor 44 comprises a signal receiver 441, such as an infrared sensor, arranged to detect the presence of the user by means of infrared signal in such a manner that when the signal receiver 441 transmits an infrared signal for detecting the presence of the user of the fluid system, the signal receiver 441 activates the power generator 43 to actuate the actuator 45 to move the valve stopper 32 so as to open the relief valve 30. Accordingly, the housing 41 has a transparent window aligned with the signal receiver 441 for allowing the infrared signal sending out through the transparent window. It is worth to mention that the signal receiver 441 activates the power generator 43 to stop the actuator 45 once the operation of the flush system is completed.

For example, when the automate fluid control system is used for the toilet system, the control processor 44 is activated in responsive to the presence of the user. Once the control processor 44 receives the signal at the time the user leaves the toilet system, the control processor 44 activates the power generator 43 to actuate the actuator 45 for opening the relief valve 30 so as to complete the flushing operation of the toilet system. Likewise, when automate fluid control system is used for the faucet system, the control processor 44 activates the power generator 43 for opening the relief valve 30 so as to allow water flowing out from the fluid outlet 13. Once the user leaves the faucet system, the control processor 44 activates the power generator 43 to actuate the actuator 45 for closing the relief valve 30.

The power generator 43, according to the preferred embodiment, is an electric motor electrically connected to the control processor 44, wherein the power generator 43 is actuated via the control processor 44 to drive the actuator 45 to rotate. Accordingly, the power generator 43 can be a conventional solenoid electrically connected to the control processor 44 to drive the actuator 45 so as to move the valve stopper 32 between the closed position and the opened position. It is worth to mention that the electric motor is more reliable than the solenoid because the electric motor provides simple mechanical work rather than using the magnetic force, so as to minimize the failure operation of the power generator 43 and to reduce the maintenance cost of the present invention. In addition, the size of the electric motor is so small in comparison with the solenoid so as to reduce the overall size of the automate fluid control system of the present invention. Therefore, the electric motor is preferred to be used to not only ensure the reliable of the automate fluid control system but also enhance the smooth operation thereof.

The actuator 45A comprises a driving arm 451 rotatably extended from the power generator 43 towards the fluid passage 31 and a pusher arm 452 non-coaxially extended from the driving arm 451 to the valve stopper 32 such that when the driving arm 451 is driven to rotate by the power generator 43, the pusher arm 452 is driven to push the valve stopper 32 at the opened position, as shown in FIG. 2. Once the driving arm 451 is driven to rotate back to its original position, the pusher arm 542 is moved away from the valve stopper 32 such that the valve stopper 32 is pulled back to the closed position, as shown in FIG. 1.

Accordingly, the pusher arm 452 of the actuator 45, having a semi-circular cross section, has a flat contacting surface 4521 and a curved contacting surface 4522, wherein at the closed position, the flat contacting surface of the pusher arm 452 faces towards the valve stopper 32 such that the valve stopper 32 is sat at the top opening of the fluid passage 31 to seal the fluid passage 31. At the opened position, the pusher arm 452 is rotated at a position that the curved contacting surface 4522 of the pusher arm 452 pushes the valve stopper 32 aside to unseal the flush passage 31 so as to allow the flush flowing to the fluid outlet 12.

As shown in FIG. 1, the valve stopper 32 has a flat side engaging surface 321 substantially engaged with the curved contacting surface 4522 of the pusher arm 452 such that when the actuator 45 is driven to rotate, the valve stopper 32 pushes by the pusher arm 452 at the side engaging surface 321 to unseal the fluid passage 31 so as to ensure the operation of the relief valve 30.

It is worth to mention that when the actuator 45 moves the valve stopper 32 aside the top opening of the flush passage 31, the fluid within the fluid chamber 13 is allowed to flow out through the fluid passage 31 so as to reduce the pressure within the fluid chamber 13, as shown in FIG. 2. At the same time, the fluid from the fluid inlet 11 fills up the fluid chamber 13 through the bleed hole 220 due to the difference of the pressure. Therefore, the sealing diaphragm 23 is lifted to unseal the fluid outlet 12 for allowing the fluid passing to the fluid outlet 12, as shown in FIG. 3. Once the actuator 45 is driven to rotate back to its original position that the valve stopper 32 is pulled back by the resilient element 35 to seal at the top opening of the fluid passage 31, the fluid within the fluid chamber 13 is blocked to flow to the fluid passage 31 and is retained back to its original pressure to stop the fluid flowing to the fluid chamber 13 through the bleed hole 220. Therefore, the sealing diaphragm 23 is dropped down to seal the fluid outlet 12 again. It is worth to mention that when the sealing diaphragm 23 is lifted up, the valve controlling shaft 33 and the valve stopper 32 are correspondingly lifted within the fluid chamber 13. Since the actuator 45 physically contacts with the valve stopper 32, the valve stopper 32 is allowed to move upwardly without affecting the operation of the actuator 45.

Figure 4:
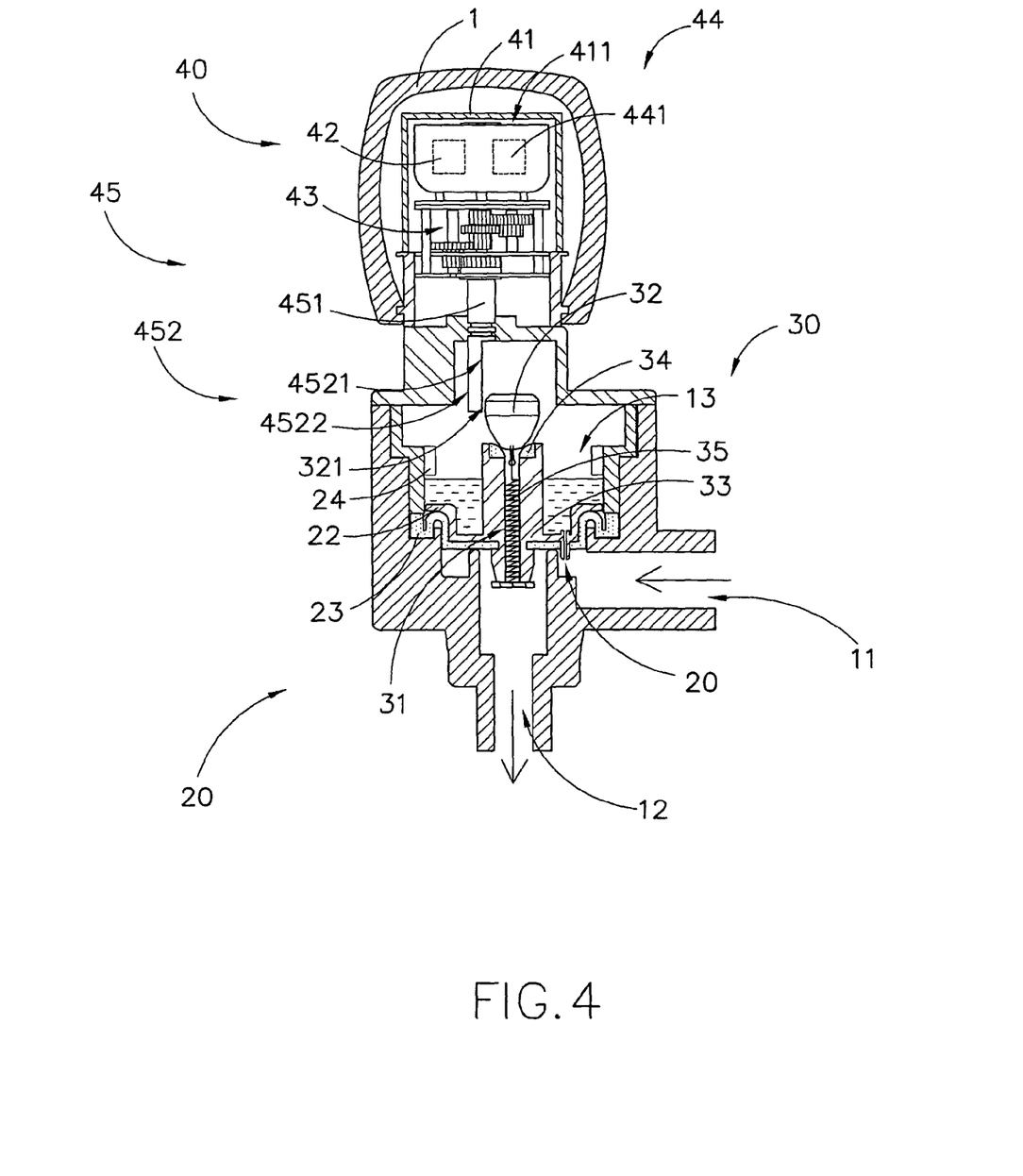
FIG. 4 is a sectional view of the automate fluid flow control system according to the above preferred embodiment of the present invention, illustrating the automate fluid flow control system incorporating with a faucet.

As shown in FIG. 4, the automate fluid flow control system of the present invention incorporates with the faucet system to provide both manual and automatic operation of the faucet system. Accordingly, the faucet system generally comprises a knob 1 operatively controlling the water flowing from the fluid inlet 11 to the fluid outlet 12 through the fluid chamber 13 in a manual manner. Once the faucet system incorporates with the automate fluid flow control system, the faucet system is adapted to be operated manually or automatically.

Figure 5:
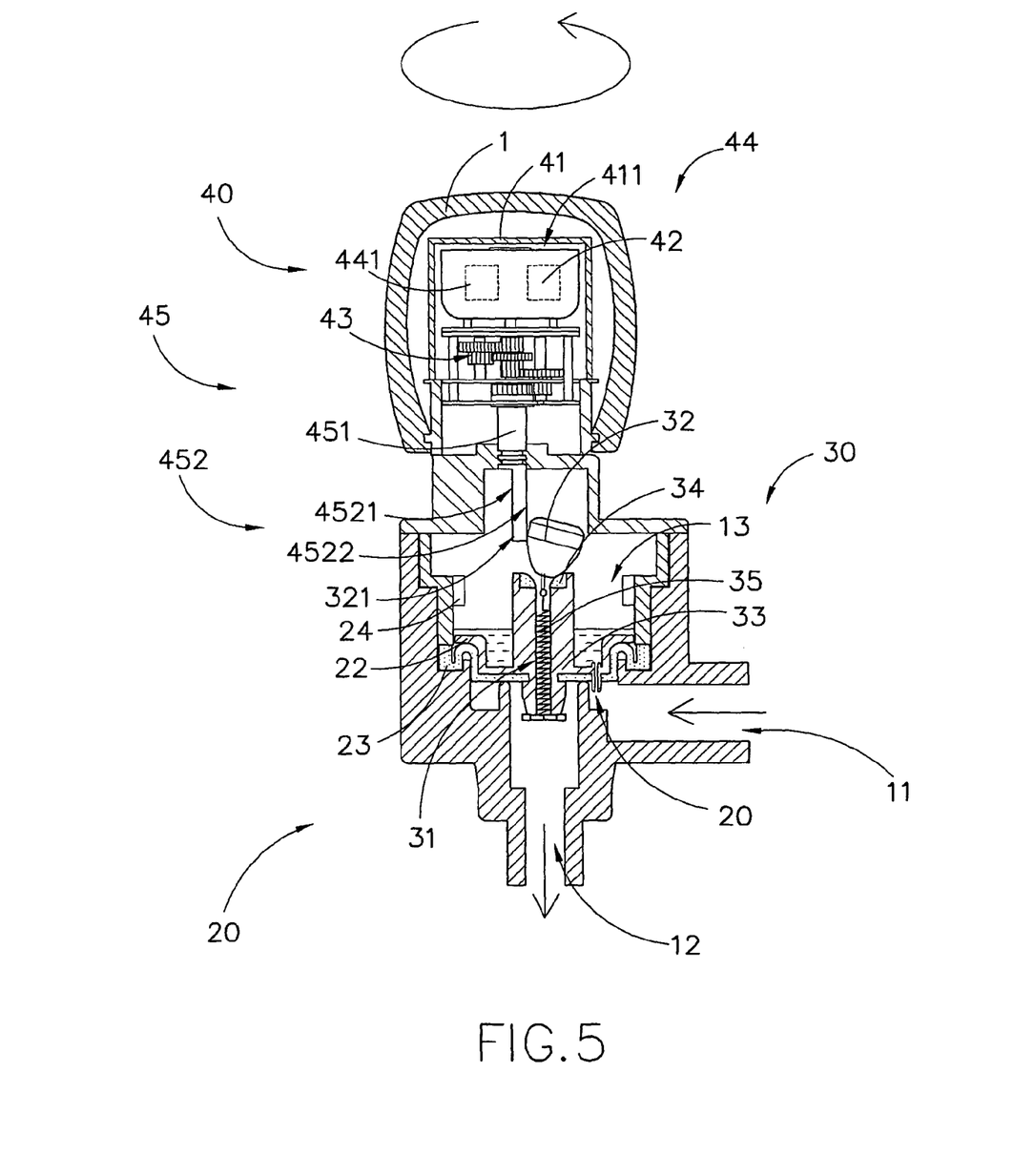
FIG. 5 is a sectional view of the automate fluid flow control system according to the above preferred embodiment of the present invention, illustrating the manual operation of the faucet with the automate fluid flow control system.
Figure 6:
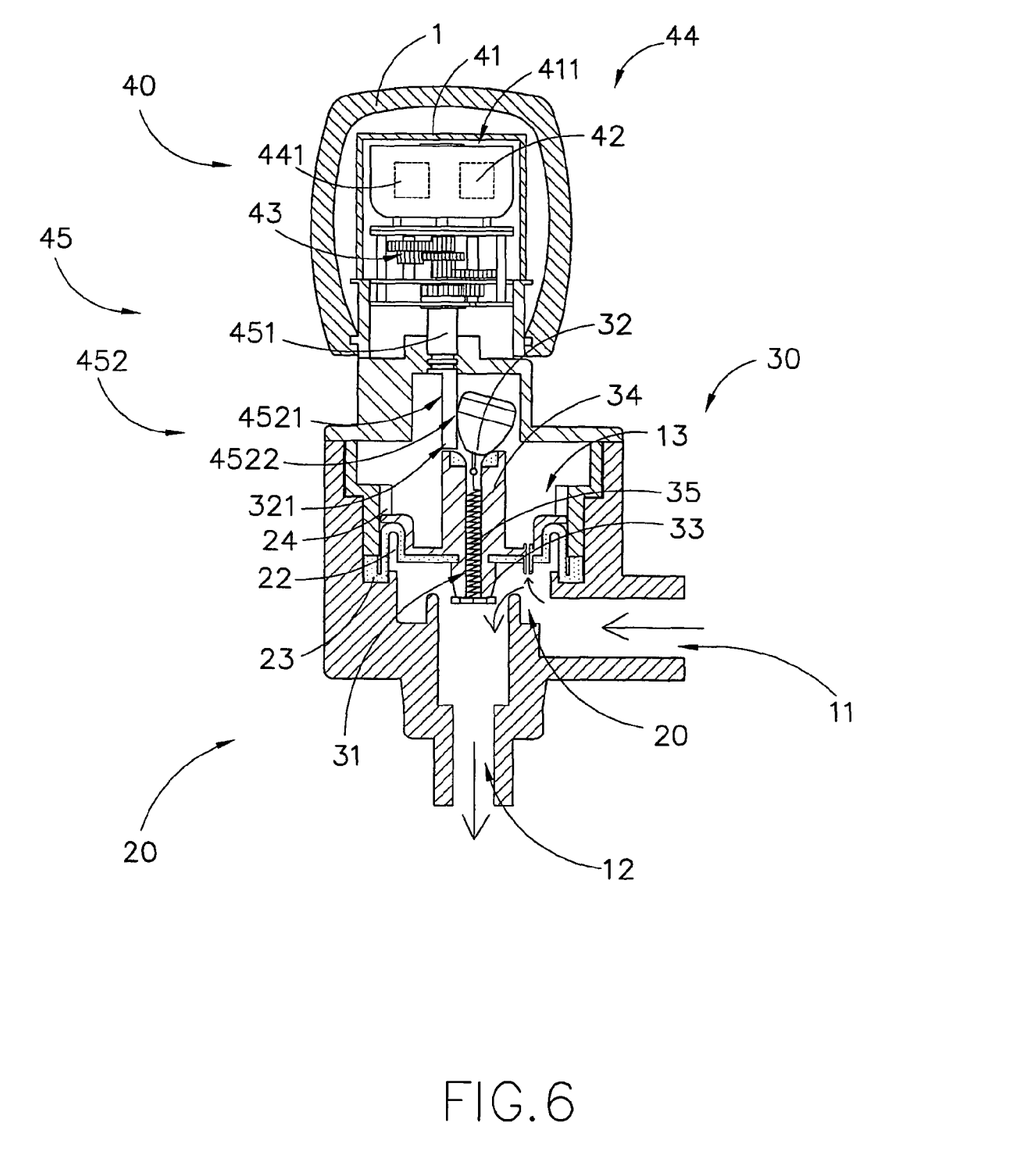
FIG. 6 is a sectional view of the automate fluid flow control system according to the above preferred embodiment of the present invention, illustrating the subsequently manual operation of the faucet with the automate fluid flow control system.

As shown in FIG. 4, the knob 1 of the faucet system is mounted at the housing 41 to manually control the actuator 45. The automate operation of the faucet system is mentioned above via the control processor 44. When the knob 1 is manually turned to drive the powering assembly 40, the actuator 45 is driven to rotate correspondingly, as shown in FIG. 5. Therefore, the pusher arm 452 of the actuator 45 pushes the valve stopper 32 aside to unseal the flush passage 31 so as to allow the flush flowing to the fluid outlet 12. Once the pressure within the fluid chamber 13 is reduced, the sealing diaphragm 23 is lifted to unseal the fluid outlet 12 for allowing the fluid passing to the fluid outlet 12, as shown in FIG. 6. When the knob 1 is turned back to its original position, the valve stopper 32 is pulled back by the resilient element 35 to seal at the top opening of the fluid passage 31. Therefore, the faucet system is adapted to be manually or automatically operated. It is worth to mention that when the knob 1 of the faucet system is adapted to selectively adjust the temperature of the fluid at the fluid outlet 12, the temperature of the fluid can be preset by the user for the automatic operation of the faucet system via the knob.

It is worth to mention that the automate fluid flow control system can be used as a valve for the fluid piping system for control the flow of fluid. In addition, the control processor 44 can be a remote controller that the user is able to remote control the operation of the electric motor to control the flow fluid.

Figure 7:
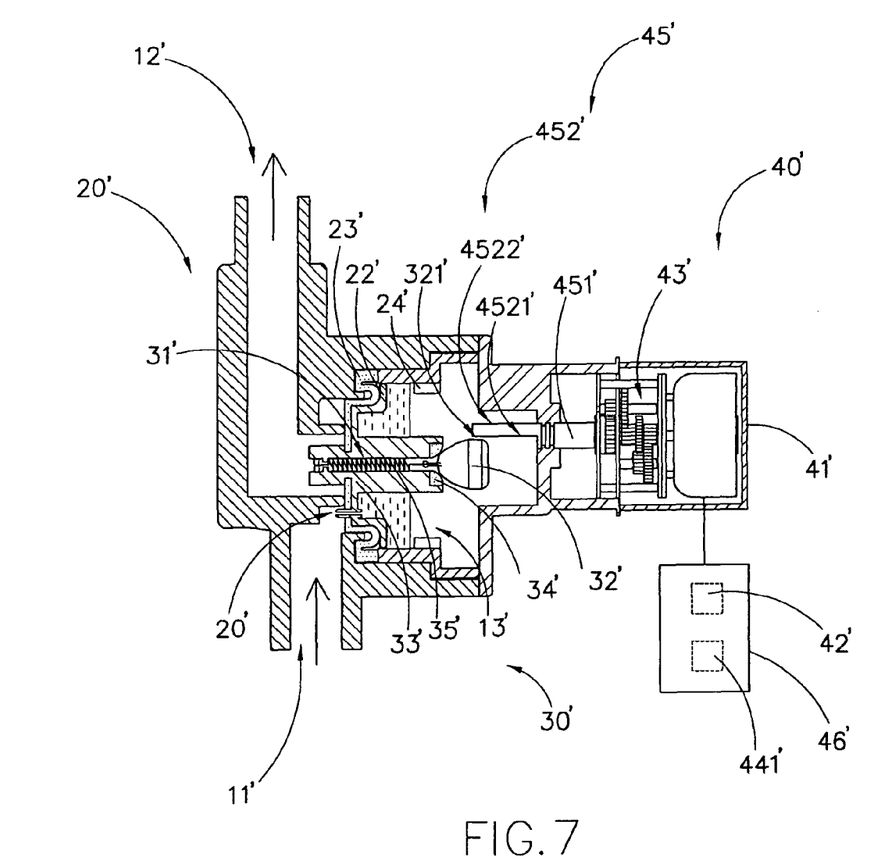
FIG. 7 is a sectional view of an automate fluid flow control system according to a second preferred embodiment of the present invention.

As shown in FIG. 7, an automate fluid control system of a second embodiment illustrates an alternative mode of the first embodiment of the present invention, wherein the automate fluid control system of the second embodiment is incorporated with the faucet 1'. It is worth to mention that the automate fluid control system of the second embodiment has the same structural configuration of the first embodiment such that the second embodiment illustrates the automate fluid control system incorporates with the built-in sensor type faucet 1'. In other words, the operation of the second embodiment is the same as the operation of the first embodiment.

The automate fluid control system comprises a valve body 10' having a fluid inlet 11', a fluid outlet 12', and a fluid chamber 13' communicating between the fluid inlet 11' and the fluid outlet 12', wherein a flow of fluid passes from the fluid inlet 11' to the fluid outlet 12' through the fluid chamber 13'. Accordingly, since the automate fluid control system is incorporated with the faucet 1', the water, which is the fluid, can pass from the fluid inlet 11' to the fluid outlet 12' through the fluid chamber 13'.

According to the preferred embodiment, the automate fluid flow control system comprises a valve member 20', a relief valve 30', and a powering assembly 40'. In comparison between the second embodiment and the first embodiment, the first embodiment illustrates the fluid inlet 11 as a side entrance and the fluid outlet 12 as a bottom exit as shown in FIG. 1. The second embodiment illustrates the fluid inlet 11' as a bottom entrance and the fluid outlet 12' as a top exit wherein the valve member 20', the relief valve 30', and the powering assembly 40' are sidewardly supported with respect to the valve body 10'. Therefore, the automate fluid flow control system according to the second embodiment can be incorporated with an existing faucet 1' as shown in FIGS. 8 to 11 by connecting the fluid inlet 11' to the water source, such as cold and/or water supply, and by connecting the fluid outlet 12' to the faucet 1' as shown in FIGS. 8 and 9.

Figure 8:
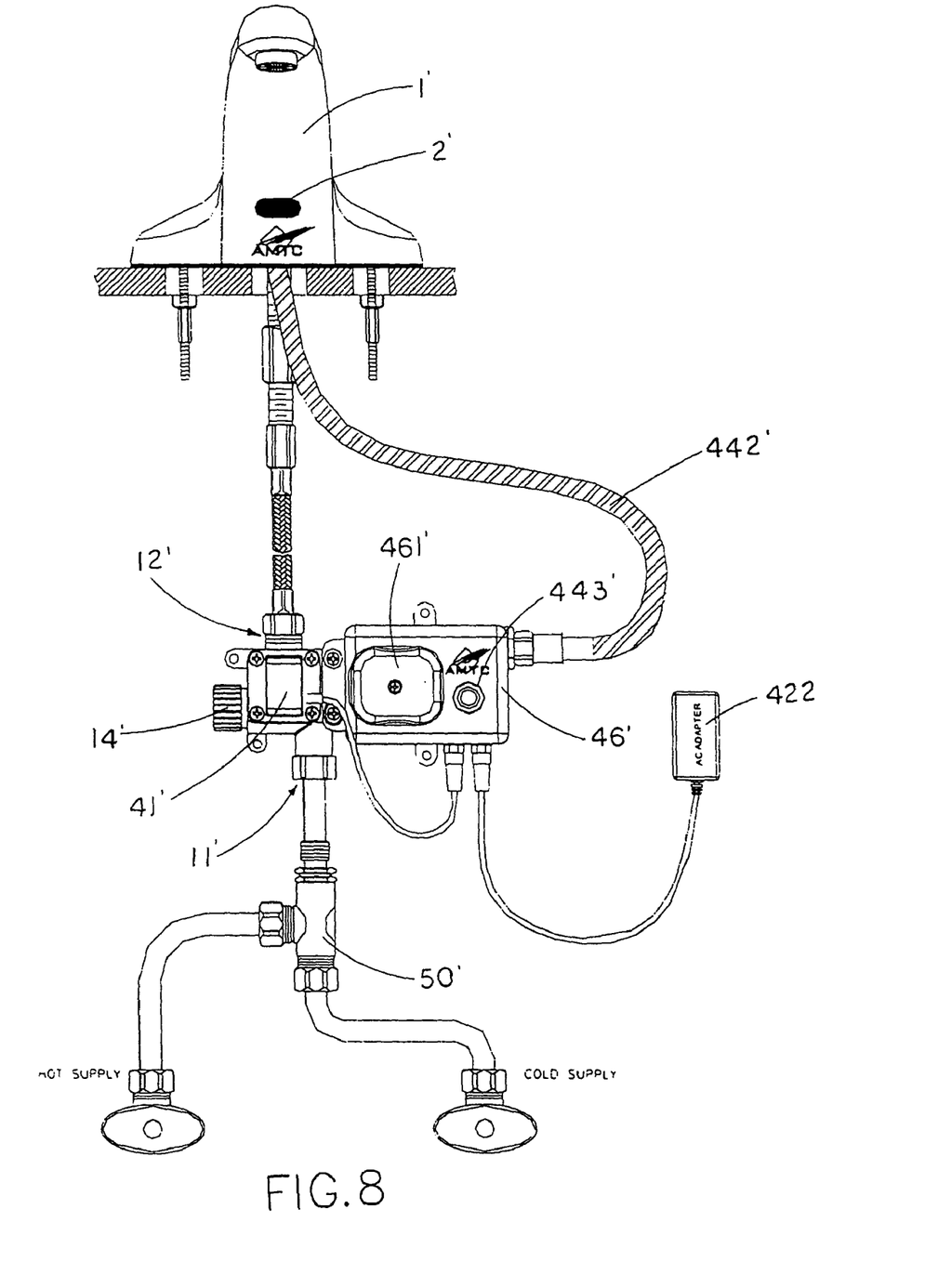
FIG. 8 is a front view of the automate fluid flow control system according to the above second preferred embodiment of the present invention, illustrating the automate fluid flow control system incorporating with a faucet.
Figure 9:
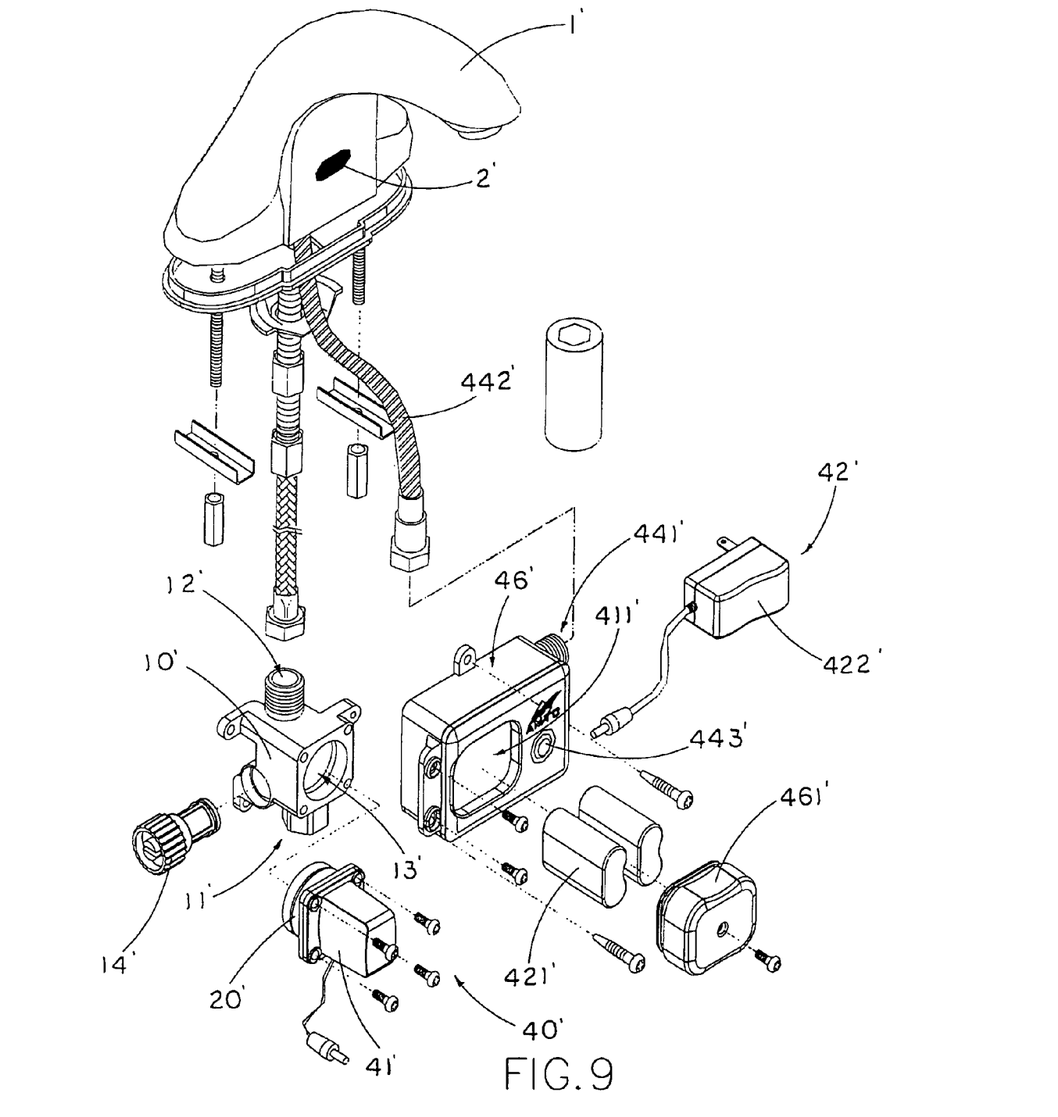
FIG. 9 is an exploded perspective view of the automate fluid flow control system according to the above second preferred embodiment of the present invention.

As shown in FIGS. 8 and 9, the valve body 10' further comprises a water filter 14' supported in the fluid chamber 13' for filtering the water passing from the fluid inlet 11' to the fluid outlet 12'. The water filter 14' can be a replaceable filter detachably mounted to the valve body 10' to filter the water at the fluid chamber 13'.

As shown in FIG. 7, the valve member 20' is sealedly disposed within the fluid chamber 13' to seal a flow of fluid flowing from the fluid inlet 11' to the fluid outlet 12', wherein the valve member 20' is adapted for retaining a predetermined pressure within the fluid chamber 13' when the valve member 20' is sealed at the fluid chamber 13'.

The relief valve 30' is provided at the valve member 20' for controlling the fluid flowing from the fluid chamber 13' to the fluid outlet 12', wherein the relief valve 30' has a fluid passage 31' extended along the valve member 20' for communicating the fluid chamber 13' with the fluid outlet 12' and comprises a valve stopper 32' sitting on a top opening of the fluid passage 31' to sealedly close the fluid passage 31' for controlling the fluid flowing to the fluid outlet 13'.

The powering assembly 40' comprises a power generator 43' and an actuator 42' driven by the power generator 41' to move the relief valve 30 between a closed position and an opened position. In which, at the closed position, the valve stopper 32' is sealedly retained to close the fluid passage 31' for blocking the fluid passing to the fluid outlet 13', and at the opened position, the actuator 42' drives the valve stopper 32' to unseal the fluid passage 31' for releasing the pressure within the fluid chamber 13' to allow the fluid passing to the fluid outlet 12'.

Accordingly, the valve member 20' comprises a sealing platform 22', having a bleed hole 220', arranged for sitting within the fluid chamber 13' and a sealing diaphragm 23' supported on the sealing platform 22' for movably sealing at the fluid chamber 13' to retain the pressure therewithin so as to normally close the fluid outlet 12'.

When the pressure within the fluid chamber 13' is higher than a pressure at the fluid outlet 12', the sealing platform 22' is pressed to seal the sealing diaphragm 23' at the fluid outlet 12' so as to block the fluid passing from the fluid inlet 11' to the fluid outlet 12'. Once the pressure within the fluid chamber 13' is reduced, the sealing platform 22' is automatically lifted that the sealing diaphragm 23' is popped up for unsealing the fluid outlet 12' so as to allow the fluid passing from the fluid inlet 11 to the fluid outlet 12'. Accordingly, the bleed hole 220' is arranged for communicating the fluid chamber 13' with the fluid inlet 11'.

The valve member 20' further comprises a retention member 24' supported within the fluid chamber 13' at a position above the sealing platform 22' to block the sealing platform 22' to be further lifted up when the pressure within the fluid chamber 13 is reduced.

he relief valve 30' further comprises a valve controlling shaft 33' coaxially extended from the sealing platform 22' of the valve member 20' wherein the fluid passage 31' is extended along the valve controlling shaft 33' for communicating the fluid chamber 13' with the fluid outlet 12'. The valve controlling shaft 33' has a top end extended within the fluid chamber 13' and a bottom end extended to said water outlet 12'. In other words, the top opening of the fluid passage 31', i.e. the top end of the valve controlling shaft 33', is positioned within the fluid chamber 13' while a bottom opening of the fluid passage, i.e. the bottom end of the valve controlling shaft 33', is positioned at the fluid outlet 12' such that the fluid chamber 13' is communicating with the fluid outlet 12' through the fluid passage 31'.

The valve stopper 32' is sat on the top end of the controlling shaft 33' at the top opening of the fluid passage 31' to sealedly close the fluid passage 31 for controlling the fluid flowing to the fluid outlet 13'. It is worth to mention that when the valve stopper 32' seals the fluid passage 31', the pressure within the fluid chamber is retained to press the valve member 20' to seal at the fluid outlet 12'.

According to the preferred embodiment, the relief valve 30' further comprises a sealing ring 34' mounted at the top end of the valve controlling shaft 33' around the top opening of the fluid passage 31' such that the valve stopper 32' is sat on the sealing ring 34' to seal the fluid passage 31' so as to block the fluid passing into the fluid passage 31' from the fluid chamber 13'.

In order to retain the valve stopper 32' in position, the relief valve 30' further comprises a resilient element 35' coupling with the valve stopper 32' for applying an urging force against the valve stopper 32' so as to retain the valve stopper 32' at the closed position. According to the preferred embodiment, the resilient element 35' is a compression spring disposed within the fluid passage 31' for applying the urging force against the valve stopper 32' so as to normally pull the valve stopper 32' at the top opening of the fluid passage 31'. As shown in FIG. 7, the resilient element 35' has a biasing end coupling with the valve stopper 32' and an opposed affixing end coupled with the bottom opening end of the fluid passage 31' to pull the valve stopper 32' at the top opening of the fluid passage 31' so as to block the fluid passing therethrough. It is worth to mention that a length of the resilient element 35' is shorter than a length of the fluid passage 31' such that when the biasing end and the affixing end of the resilient element 35' are coupled with the valve stopper 32' and the bottom opening end of the fluid passage 31' respectively, the resilient element 35' are stretched to pull the valve stopper 32' at the top opening of the fluid passage 31'.

The powering assembly 40' comprises a housing 41' mounted on the valve member 20' to house the power generator 43' and the actuator 42', and has a power source compartment 411' and a power source 42' which is replaceably received in the power source compartment 411' and is electrically connected to the power generator 43'. It is worth to mention that the power generator 43' is received in the housing 41'.

The powering assembly 40' further comprises a control module 46' operatively connected to the power generator 43', wherein the power source compartment 411' is formed in the control module 46' to receive the power source 42' therein.

Figure 10A:
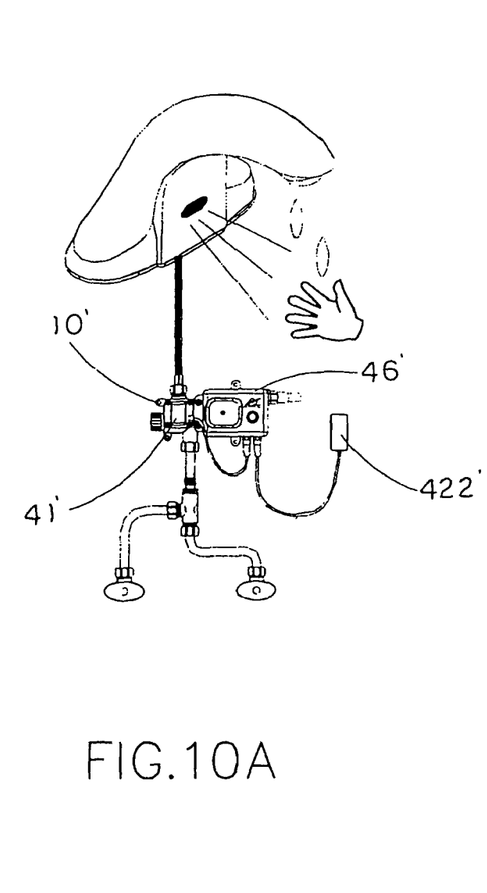
FIGS. 10A and 10B illustrate the automate fluid flow control system powered by batteries and/or AC power according to the above second preferred embodiment of the present invention.
Figure 10B:
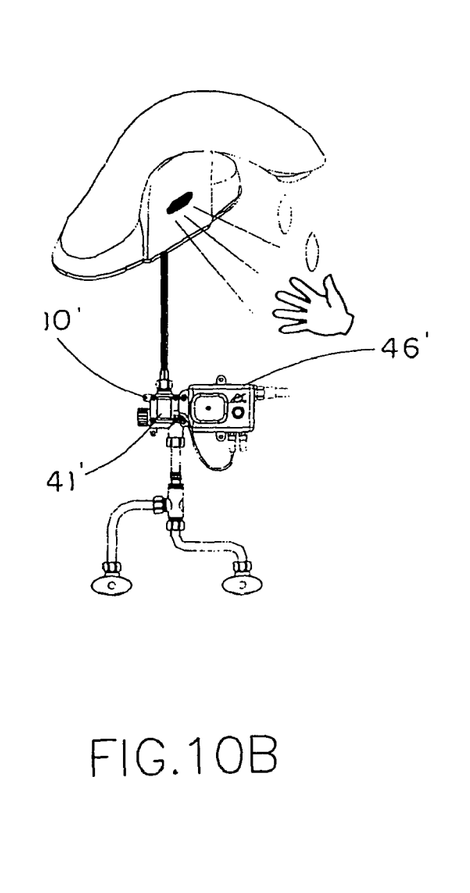
Figure 11:
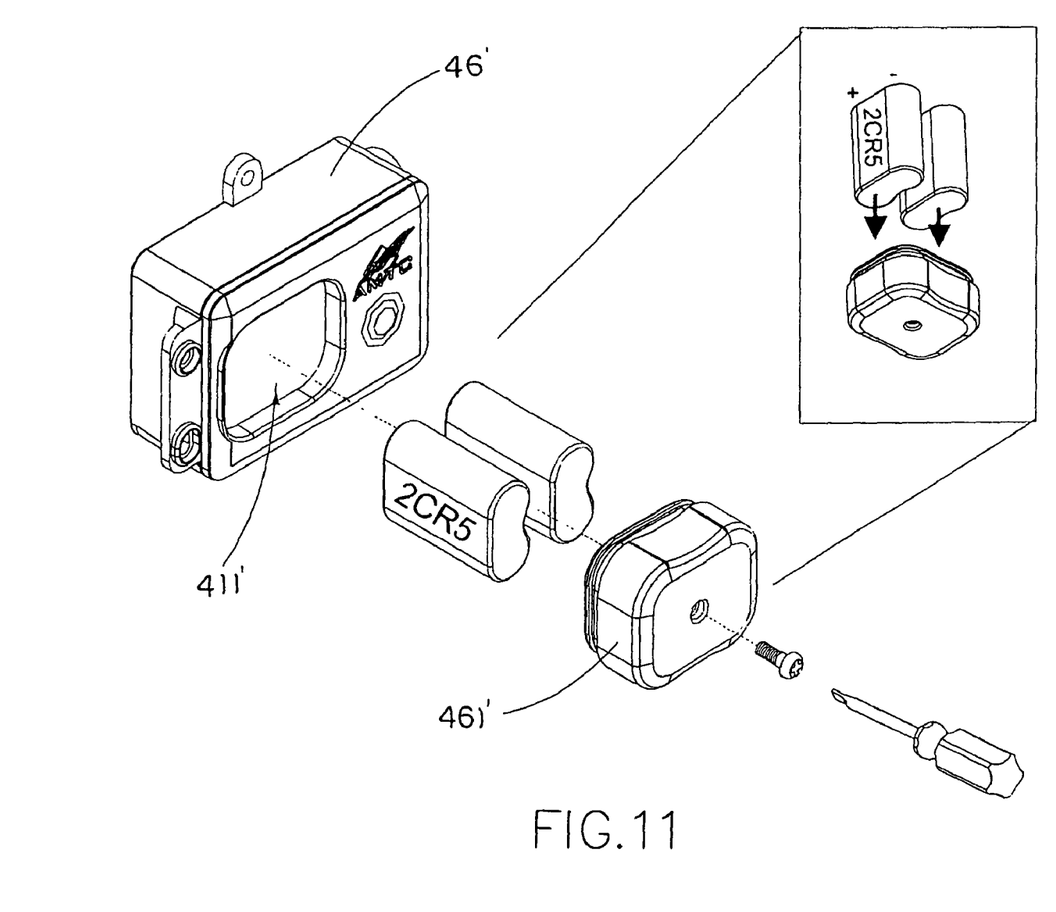
FIG. 11 illustrates the battery installation of the automate fluid flow control system according to the above second preferred embodiment of the present invention.

As shown in FIGS. 10A and 10B, the power source 42' can be a battery 421' and/or AC power. For AC current, the power source 42' further comprises an AC adapter 422' electrically connecting to an external AC power such that the automate fluid control system can be selectively powered by either battery or AC power. As shown in FIG. 10A, both battery 421' and the AC adapter 422' are used wherein the rechargeable battery 421' is used as a backup power source. It is worth to mention that the battery 421' will not drain with AC adapter 422' on. If the AC adapter 422' is not connected, as shown in FIG. 10B, the battery 421' is used for power. It is worth to mention that the battery 421' can be a rechargeable battery or a replaceable battery. Therefore, the user is able to replace the old battery by simply opening a control module cover 461' of the control module 46' to expose the power source compartment 411', as shown in FIG. 11.

The powering assembly 40' further comprises a control processor 44' electrically connected to the power source 42' and the power generator 43' for sensing a presence of a user, so as to activate the power generator 43' to drive the actuator 45' to rotate. The control processor 44' is received in the control module 46' to electrically connect to the power source 42'. Accordingly, the control processor 44' comprises a signal receiver 441' for receiving an infrared signal from an infrared sensor which is arranged to detect the presence of the user by means of infrared signal. When the signal receiver 441' receives an infrared signal from the infrared sensor which detects the presence of the user of the fluid system, the signal receiver 441' activates the power generator 43' to actuate the actuator 45' to move the valve stopper 32' so as to open the relief valve 30'. Accordingly, since the faucet 1' has a built-in sensor 2', a signal cable 442' can be simply used to connect the built-in sensor 2' of the faucet 1' to transmit the signal from the built-in sensor 2' to the signal receiver 441'. It is worth to mention that the signal receiver 441' activates the power generator 43' to stop the actuator 45' once the operation of the faucet 1' is completed.

In other words, when the automate fluid control system is used for the faucet system, the control processor 44' is activated in responsive to the presence of the user. Once the control processor 44' receives the signal at the time the hand of the user locates within the coverage of the built-in sensor 2' of the faucet 1', the signal receiver 441' receives an infrared signal from the built-in sensor 2'. Then, the control processor 44' activates the power generator 43' to actuate the actuator 45' for opening the relief valve 30' so as to allow the water flowing to the faucet 1'. Once the hand of the user locates out of the coverage of the built-in sensor 2' of the faucet 1', the control processor 44' activates the power generator 43' to actuate the actuator 45' for closing the relief valve 30'.

In other words, to activate the faucet 1', the user must place his/her hand(s) under the spout of the faucet 1' where the coverage of the built-in sensor 2' covers. The sensor beam from the built-in sensor 2' will become interrupted and the faucet 1' will activate on. The faucet 1' will remain on until the user has completely moved the hand(s) away from the sensing beam. Once the hand(s) of the user moves out of the coverage of the built-in sensor 2', the faucet 1' will turn completely off after approximately two seconds.

Figure 12:
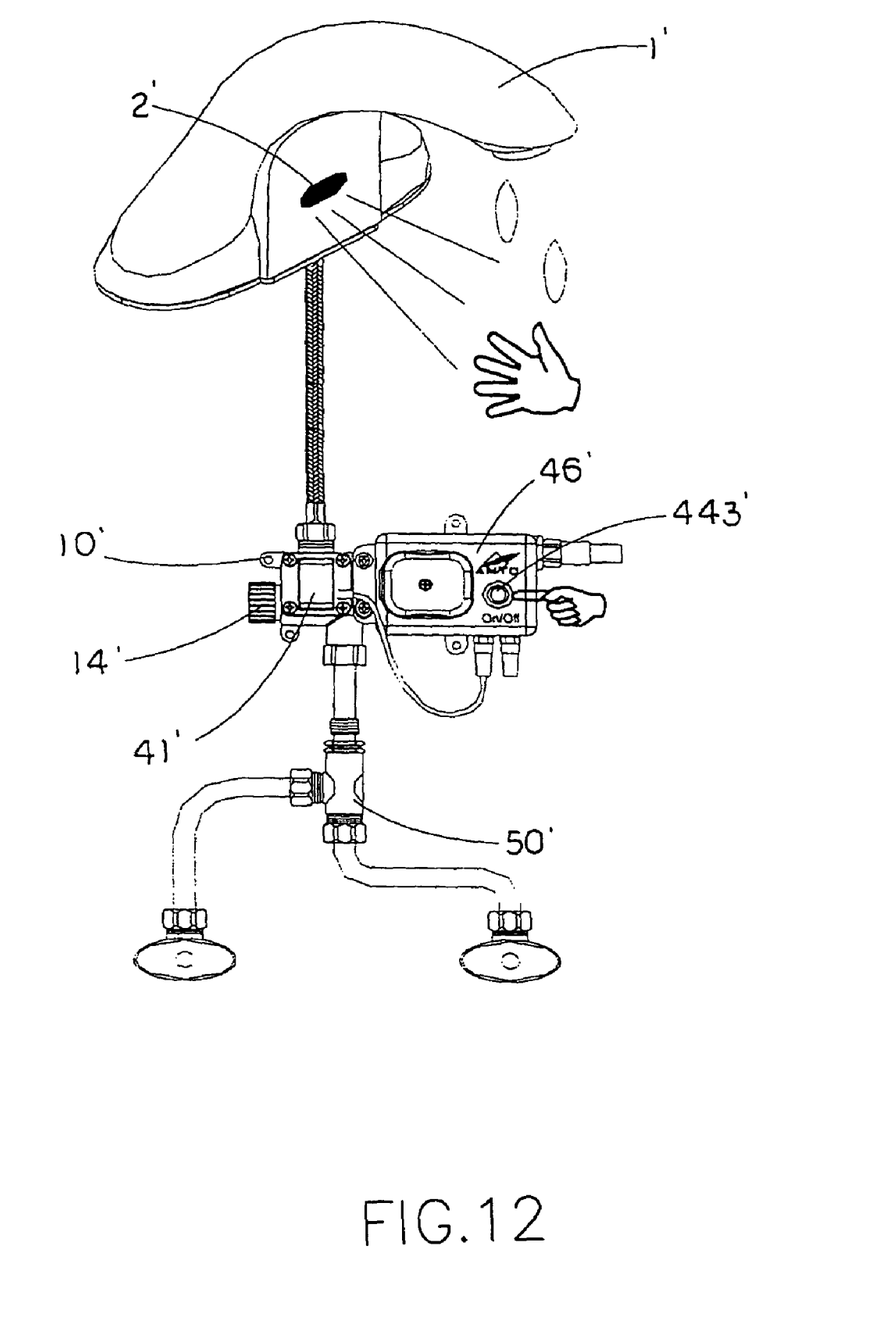
FIG. 12 illustrates the setting of the sensor range of the automate fluid flow control system according to the above second preferred embodiment of the present invention.

The control processor 44' is adapted to set the sensor range of the built-in sensor 2'. The control processor 44' comprises a control button 443' provided at the control module 46' to control the sensor range of the built-in sensor 2'. Accordingly, when the user pushes the control button 443' located on the front side of the control module 46' and keeps pushing it for about 5 to 7 seconds, the built-in sensor 2' of the faucet 1' will activate once and the red LED light located on the sensor eye of the spout will be on. Once the LED light is on, the user can release the control button 443', the built-in sensor 2' of the faucet 1' will go into setup mode. The user is able to use one hand and place the hand exactly in front of the sensor eye of the built-in sensor 2' at the distance that the user would like to sensor to reach. Once the user have placed the hand at the desired sensing distance, the user would keep the hand steady at that point for about 5 to 10 seconds until the red LED light beings to flash continuously. Once the LED light begins to flash, the user is able to use the free hand to press the control button 443' while the control hand still holds at the desired sensing point. This will lock the sensing range at that desired point.

The power generator 43', according to the preferred embodiment, is an electric motor electrically connected to the control processor 44', wherein the power generator 43' is actuated via the control processor 44' to drive the actuator 45' to rotate. Accordingly, the power generator 43' can be a conventional solenoid electrically connected to the control processor 44' to drive the actuator 45' so as to move the valve stopper 32' between the closed position and the opened position. It is worth to mention that the electric motor is more reliable than the solenoid because the electric motor provides simple mechanical work rather than using the magnetic force, so as to minimize the failure operation of the power generator 43' and to reduce the maintenance cost of the present invention. In addition, the size of the electric motor is so small in comparison with the solenoid so as to reduce the overall size of the automate fluid control system of the present invention. Therefore, the electric motor is preferred to be used to not only ensure the reliable of the automate fluid control system but also enhance the smooth operation thereof.

The actuator 45' comprises a driving arm 451' rotatably extended from the power generator 43' towards the fluid passage 31' and a pusher arm 452' non-coaxially extended from the driving arm 451' to the valve stopper 32' such that when the driving arm 451' is driven to rotate by the power generator 43', the pusher arm 452' is driven to push the valve stopper 32' at the opened position, which is similar to FIG. 2. Once the driving arm 451' is driven to rotate back to its original position, the pusher arm 542' is moved away from the valve stopper 32' such that the valve stopper 32' is pulled back to the closed position, as shown in FIG. 7.

Accordingly, the pusher arm 452' of the actuator 45', having a semi-circular cross section, has a flat contacting surface 4521' and a curved contacting surface 4522', wherein at the closed position, the flat contacting surface 4521' of the pusher arm 452' faces towards the valve stopper 32' such that the valve stopper 32' is sat at the top opening of the fluid passage 31' to seal the fluid passage 3 1'. At the opened position, the pusher arm 452' is rotated at a position that the curved contacting surface 4522' of the pusher arm 452' pushes the valve stopper 32' aside to unseal the flush passage 31' so as to allow the flush flowing to the fluid outlet 12'.

Accordingly, the valve stopper 32' has a flat side engaging surface 321' substantially engaged with the curved contacting surface 4522' of the pusher arm 452' such that when the actuator 45' is driven to rotate, the valve stopper 32' pushes by the pusher arm 452' at the side engaging surface 321' to unseal the fluid passage 31' so as to ensure the operation of the relief valve 30'.

It is worth to mention that when the actuator 45' moves the valve stopper 32' aside the top opening of the flush passage 31', the fluid within the fluid chamber 13' is allowed to flow out through the fluid passage 31' so as to reduce the pressure within the fluid chamber 13'. At the same time, the fluid from the fluid inlet 11' fills up the fluid chamber 13' through the bleed hole 220' due to the difference of the pressure. Therefore, the sealing diaphragm 23' is lifted to unseal the fluid outlet 12' for allowing the fluid passing to the fluid outlet 12'. Once the actuator 45' is driven to rotate back to its original position that the valve stopper 32' is pulled back by the resilient element 35' to seal at the top opening of the fluid passage 31', the fluid within the fluid chamber 13' is blocked to flow to the fluid passage 31' and is retained back to its original pressure to stop the fluid flowing to the fluid chamber 13' through the bleed hole 220'. Therefore, the sealing diaphragm 23' is dropped down to seal the fluid outlet 12' again. It is worth to mention that when the sealing diaphragm 23' is lifted up, the valve controlling shaft 33' and the valve stopper 32' are correspondingly lifted within the fluid chamber 13'. Since the actuator 45' physically contacts with the valve stopper 32', the valve stopper 32' is allowed to move upwardly without affecting the operation of the actuator 45'.

It is worth to mention that the automate fluid flow control system allows hot and cold water passing therethrough to the faucet 1', wherein a thermostatic mixing valve 50' is used to connect to hot water supply and cold water supply such that the user is able to adjust the temperature of the water to flow to the faucet 1' through the automate fluid flow control system by selectively adjusting the ratio of the hot and cold water from the hot water supply and cold water supply respectively.

One skilled in the art will understand that the embodiment of the present invention as shown in the drawings and described above is exemplary only and not intended to be limiting.

It will thus be seen that the objects of the present invention have been fully and effectively accomplished. The above embodiments are shown and described for the purposes of illustrating the functional and structural principles of the present invention and is subject to change without departure from such principles. Therefore, this invention includes all modifications encompassed within the spirit and scope of the following claims.

What is claimed is:

1. An automate fluid flow control system for a fluid system having a fluid inlet, a fluid outlet, and a fluid chamber communicating between said fluid inlet and said fluid outlet, wherein said automate fluid flow control system comprises:

a valve member adapted for being sealedly disposed within said fluid chamber to seal a flow of fluid flowing from said fluid inlet to said fluid outlet;

a relief valve provided at said valve member for controlling said fluid flowing from said fluid chamber to said fluid outlet, wherein said relief valve has a fluid passage extended along said valve member for communicating said fluid chamber with said fluid outlet and comprises a valve stopper sitting on a top opening of said fluid passage to sealedly close said fluid passage for controlling said fluid flowing to said fluid outlet, wherein said valve stopper has an engaging surface;

a power generator;

an actuator driven by said power generator to control said relief valve between a closed position and an opened position, wherein at said closed position, said valve stopper is retained to sealedly close said fluid passage for blocking said fluid passing to said fluid outlet, and at said opened position, said actuator is driven by said power generator to contact with said engaging surface of said valve stopper and to drive said valve stopper to open said fluid passage for releasing a pressure within said water chamber to allow said fluid passing to said fluid outlet, wherein said actuator comprises a driving arm rotatably extended from said power generator towards said fluid passage and a pusher arm non-coaxially extended from said driving arm to said valve stopper for pushing said engaging surface of said valve stopper from said closed position to said opened position, wherein said valve member comprises a sealing platform arranged for sitting within said fluid chamber, a sealing diaphragm supported on said sealing platform for movably sealing at said fluid chamber to retain said pressure therewithin, and a retention member supported within said fluid chamber at a position above said sealing platform to block said sealing platform to be further lifted up when said pressure within said fluid chamber is reduced;

a resilient element to apply an urging force against said valve stopper so as to retain said valve stopper at said closed position; and a knob operatively communicated said automate fluid flow control system defining an original position corresponding to said closed position, wherein when said knob is turned from said original position to drive said actuator to rotate correspondingly from said closed position to said opened position, said pusher arm of said actuator will push said valve stopper to unseal said fluid passage, wherein when said knob is turned back to said original position to drive said actuator to rotate correspondingly from said opened position to said closed position, said pusher arm of said actuator will stop pushing said valve stopper and allow said valve stopper to return to said closed position.

2. An automate fluid flow control system for a fluid system having a fluid inlet, a fluid outlet, and a fluid chamber communicating between said fluid inlet and said fluid outlet, wherein said automate fluid flow control system comprises:

a valve member adapted for being sealedly disposed within said fluid chamber to seal a flow of fluid flowing from said fluid inlet to said fluid outlet;

a relief valve provided at said valve member for controlling said fluid flowing from said fluid chamber to said fluid outlet, wherein said relief valve has a fluid passage extended along said valve member for communicating said fluid chamber with said fluid outlet and comprises a valve stopper sitting on a top opening of said fluid passage to sealedly close said fluid passage for controlling said fluid flowing to said fluid outlet;

a power generator;

an actuator driven by said power generator to control said relief valve between a closed position and an opened position, wherein at said closed position, said valve stopper is retained to sealedly close said fluid passage for blocking said fluid passing to said fluid outlet, and at said opened position, said actuator is driven by said power generator to drive said valve stopper to open said fluid passage for releasing a pressure within said water chamber to allow said fluid passing to said fluid outlet, wherein said actuator comprises a driving arm rotatable extended from said power generator towards said fluid passage and a pusher arm non-coaxially extended from said driving arm to said valve stopper for pushing said valve stopper from said closed position to said opened position, wherein said valve member comprises a sealing platform arranged for sitting within said fluid chamber, a sealing diaphragm supported on said sealing platform for movably lifting up and dropping down the fluid passage, and a retention member supported within said fluid chamber at a position above said sealing platform to block said sealing platform to be further lifted up when said pressure within said fluid chamber is reduced: and a knob operatively communicated said automate fluid flow control system defining an original position corresponding to said closed position, wherein when said knob is turned from said original position to drive said actuator to rotate correspondingly from said closed position to said opened position, said pusher arm of said actuator will push said valve stopper to unseal said fluid passage, wherein when said knob is turned back to said original position to drive said actuator to rotate correspondingly from said opened position to said closed position, said pusher arm of said actuator will stop pushing said valve stopper and allow said valve stopper to return to said closed position.

* * * * *